(12) United States Patent
Dula et al.

(10) Patent No.: US 11,766,594 B2
(45) Date of Patent: Sep. 26, 2023

(54) MULTILAYER ANTI-SLIP COMPACT STRUCTURE FOR INDIVIDUAL/JOINT APPLICATION ON A FOREHAND AND/OR A BACKHAND SIDE OF A HOCKEY STICK BLADE

(71) Applicant: Rezztek Technology, Inc., Wilmington, DE (US)

(72) Inventors: Andrej Dula, Bratislava (SK); Ondrej Chovanec, Bratislava (SK)

(73) Assignee: SPECTER SPORTS A.S., Bratislava—mestska cast Petrzalka (SK)

( * ) Notice: Subject to any disclaimer, the term of this patent is extended or adjusted under 35 U.S.C. 154(b) by 920 days.

(21) Appl. No.: 16/632,840

(22) PCT Filed: Aug. 21, 2018

(86) PCT No.: PCT/SK2018/000006
§ 371 (c)(1),
(2) Date: Jan. 21, 2020

(87) PCT Pub. No.: WO2019/040007
PCT Pub. Date: Feb. 28, 2019

(65) Prior Publication Data
US 2021/0146209 A1 May 20, 2021

(30) Foreign Application Priority Data
Aug. 22, 2017 (SK) ...................................... 85-2017

(51) Int. Cl.
*A63B 59/70* (2015.01)
*C08J 7/043* (2020.01)
(Continued)

(52) U.S. Cl.
CPC .............. *A63B 59/70* (2015.10); *B32B 5/028* (2013.01); *B32B 7/12* (2013.01); *B32B 27/12* (2013.01);
(Continued)

(58) Field of Classification Search
CPC . A63B 59/70; A63B 2102/22; A63B 2102/24; A63B 2209/00; A63B 2209/023;
(Continued)

(56) References Cited

U.S. PATENT DOCUMENTS 2,912,245 A 11/1959 Gardner et al.
3,458,194 A 7/1969 Coles
(Continued)

FOREIGN PATENT DOCUMENTS

CA 984420 A 2/1976
CA 1178983 A 12/1984
(Continued)

OTHER PUBLICATIONS

International Search Report of Application No. PCT/SK2018/000006 dated Dec. 3, 2018.
(Continued)

*Primary Examiner* — Jeffrey S Vanderveen
(74) *Attorney, Agent, or Firm* — Mark S. Cohen; PEARL COHEN ZEDEK LATZER BARATZ LLP

(57) ABSTRACT

A multilayer anti-slip compact structure for individual/joint application on a forehand and/or a backhand side of a hockey stick blade, which contains a backing carrier (A) and an anti-slip layer (B) applied on said backing carrier (A), wherein the backing carrier (A) contains a first layer with thickness max. 0.3 mm and tensile strength min. 400 N and weight max. 130 g/m²; on the first layer, a second resin or glue layer (3) with thickness max. 0.1 mm containing polyurethane, polyacrylate, organic resin or suitable poly-
(Continued)

mer, or their combination; and the anti-slip layer (B) is formed by a third resin layer (5) with content of epoxide and/or phenol or polymer with thickness max. 0.1 mm and weight max. 250 g/m². The first layer of the backing carrier (A) is formed by a plastic film (1) from a polymer or a fibre/net structure (2) from fibres containing cotton, viscose, glass fibres, plastic fibres, polyester fibres, or their combination.

46 Claims, 4 Drawing Sheets

(51) Int. Cl.

| | | |
|---|---|---|
| *C08J 7/046* | (2020.01) | |
| *B32B 5/02* | (2006.01) | |
| *B32B 7/12* | (2006.01) | |
| *B32B 27/12* | (2006.01) | |
| *B32B 27/20* | (2006.01) | |
| *B32B 27/38* | (2006.01) | |
| *C08J 7/04* | (2020.01) | |
| *D06N 3/00* | (2006.01) | |
| *A63B 102/22* | (2015.01) | |
| *A63B 102/24* | (2015.01) | |

(52) U.S. Cl.
CPC .............. *B32B 27/20* (2013.01); *B32B 27/38* (2013.01); *C08J 7/042* (2013.01); *C08J 7/043* (2020.01); *C08J 7/046* (2020.01); *D06N 3/0006* (2013.01); *D06N 3/0036* (2013.01); *D06N 3/0059* (2013.01); *A63B 2102/22* (2015.10); *A63B 2102/24* (2015.10); *A63B 2209/00* (2013.01); *A63B 2209/023* (2013.01); *B32B 2255/02* (2013.01); *B32B 2255/26* (2013.01); *B32B 2260/021* (2013.01); *B32B 2262/0276* (2013.01); *B32B 2262/101* (2013.01); *B32B 2307/54* (2013.01); *B32B 2307/718* (2013.01); *B32B 2307/73* (2013.01); *B32B 2307/744* (2013.01); *C08J 2333/04* (2013.01); *C08J 2333/08* (2013.01); *C08J 2363/00* (2013.01); *C08J 2375/04* (2013.01); *C08J 2433/08* (2013.01); *C08J 2475/04* (2013.01); *D06N 2205/10* (2013.01); *D06N 2209/105* (2013.01); *D06N 2209/106* (2013.01)

(58) Field of Classification Search
CPC ......... A63B 60/14; A63B 60/08; B32B 5/028; B32B 7/12; B32B 27/12; B32B 27/20; B32B 27/38; B32B 2255/02; B32B 2255/26; B32B 2260/021; B32B 2262/0276; B32B 2262/101; B32B 2307/54; B32B 2307/718; B32B 2307/73; B32B 2307/744; B32B 27/08; B32B 27/36; B32B 27/42; B32B 2250/02; B32B 2255/10; B32B 2260/04; B32B 2262/04; B32B 2262/062; B32B 2262/14; B32B 2307/7265; B32B 2307/732; B32B 2307/734; C08J 7/042; C08J 7/043; C08J 7/046; C08J 2333/04; C08J 2333/08; C08J 2363/00; C08J 2375/04; C08J 2433/08; C08J 2475/04; C08J 2367/00; D06N 3/0006; D06N 3/0036; D06N 3/0059; D06N 2205/10; D06N 2209/105; D06N 2209/106; B24D 11/02
See application file for complete search history.

(56) References Cited

U.S. PATENT DOCUMENTS

| | | |
|---|---|---|
| 4,148,482 A | 4/1979 | Harwell, Jr. et al. |
| 4,458,194 A | 7/1984 | Geppert et al. |
| 5,728,016 A | 3/1998 | Hsu |
| 6,183,383 B1 | 2/2001 | McSorley |
| 2013/0160921 A1 | 6/2013 | DiCasmirro |

FOREIGN PATENT DOCUMENTS

| | | | |
|---|---|---|---|
| CA | 2118740 | A1 | 9/1995 |
| GB | 547946 | A | 3/1941 |
| WO | WO 1982/003789 | | 11/1982 |
| WO | WO 1995/11111 | A1 | 4/1995 |
| WO | WO 1996/09096 | A1 | 3/1996 |
| WO | WO 1997/47365 | A1 | 12/1997 |
| WO | WO 1998/40132 | A1 | 9/1998 |
| WO | WO 2013/091079 | A1 | 6/2013 |

OTHER PUBLICATIONS

Communication Under Rule 71(3) EPC in related European Application No. 18766399.2 dated Sep. 14, 2022.
Decision to Grant a European Patent pursuant to Article 97(1) EPC in related European Application No. 18766399.2 dated Oct. 7, 2022.
International Preliminary Report on Patentability of Application No. PCT/SK2018/000006 dated Feb. 25, 2020.
Examiner Requisition and Search Report in related Canadian Application No. 3,052,042 dated Nov. 25, 2020.
Notice of Allowance in related Canadian Application No. 3,052,042 dated Feb. 15, 2021.
Office Action and Search Report in related Chinese Application No. 2018800491673 dated Sep. 27, 2020 (and English translation).
Notification to Grant Patent Right for Invention in related Chinese Application No. 2018800491673 dated May 8, 2021 (and English translation).
Office Action in related European Application No. 18766399.2 dated May 10, 2021.
Office Action in related European Application No. 18766399.2 dated Nov. 3, 2021.
Office Action in related European Application No. 18766399.2 dated Feb. 2, 2022.
Search Report in related Russian Application No. 2020103925 dated Oct. 6, 2021.
Office Action in related Russian Application No. 2020103925 dated Oct. 12, 2021 (and English summary).
Decision on Patent Grant in related Russian Application No. 2020103925 dated Feb. 8, 2022 (and English summary).
Search Report in related Slovak Application No. PP 85-2017 dated May 9, 2018 (and English summary).

MULTILAYER ANTI-SLIP COMPACT STRUCTURE FOR INDIVIDUAL/JOINT APPLICATION ON A FOREHAND AND/OR A BACKHAND SIDE OF A HOCKEY STICK BLADE

CROSS-REFERENCE TO RELATED APPLICATIONS

This application is a National Phase Application of PCT International Application No. PCT/SK2018/000006, filed Aug. 21, 2018, claiming priority to Slovak Application No. PP 85-2017, filed Aug. 22, 2017, which are hereby incorporated by reference in their entirety.

TECHNICAL FIELD

Patent invention is related to the composition of the backing carrier and anti-slip layer, which form together a multilayer anti-slip compact structure for individual/joint application on the forehand and/or backhand side of the hockey stick blade using an adhesive layer. For the above-mentioned reason, the subject matter of this invention belongs to the field of sport games and entertainment, above all collective games using hockey stick and puck or ball.

BACKGROUND OF THE INVENTION

Until now known solutions of hockey sticks and blades gradually developed from prevailing wooden and laminated materials to more modern ones, as for instance aluminium, carbon fibres, kevlar or titanium. All surface treatments of hockey stick and blade have smooth surface. But smooth surface does not provide good puck or ball control during handling, passes and shooting, because puck or ball would slide on the smooth surface. Up to the present known methods for treatment of smooth surfaces of hockey sticks and blades were based for instance on winding round a tape, made mainly from textile or rubber, as proven by the published document U.S. Pat. No. 2,912,245 A. Smooth surface of hockey stick and hockey stick blade could be coarse grained using notches or grooves, or by placement of rubber patch with spikes directly on blade, as proven by the published document CA 1,178,983 A. Textile tape, permanently market dominant, have short life span and after partial damage it would be necessary to replace the entire tape. This tape is also very predisposed to catch snow and ice and to get water soaked with the consequence of weight increase and reduction of abilities to handle puck or ball, what we have documented by the published patent file U.S. Pat. No. 4,458,194 with described tape with bristles. Rubber patches are as a rule thicker and heavier than textile tapes and do not provide sufficient increase of coarseness of the hockey stick blade. Their shape and properties at different temperatures could differ, as hockey could be played at temperatures with difference up to 50° C. The proof of lack of functionality of the existing alternative solutions compared to standard tape for hockey stick is documented by their commercial ill success, because 99% of players still use traditional textile tape.

From the technology up to the present solutions are also known, in which the coarsening of the hockey stick surface was provided by application of an adhesive layer with content of different firm particles, as described for instance in the Canadian patent file CA984420 and published international patent application WO96/09096 and it is also possible to create this adhesive layer by spraying.

The actual trend of hockey stick producers is represented by permanent reduction of weight of hockey stick, even down to the level of grams. Disadvantages represented by the additional weight in the form of application of hockey tapes or other treatments of the surface, producers of hockey sticks do not have under their control, despite the fact that the additional uncontrolled increase of weight would change the hockey stick balance and properties.

Some documents, as for instance CA 2,118,740A1, U.S. Pat. Nos. 6,183,383, 3,458,194, WO 98/40132 (A1), underline only certain properties, which are underlined in the solution according to this invention, what means that they do not follow all important product parameters. The same is valid for other documents, which also address only certain necessary properties, which are underlined in this invention, for example:

WO 97/47365 (A1), which is mainly focused on ridges on control fascia surface and its granularity WO 2013091079 (A1), which is focused on an idea of friction tape having two different opposing surfaces (adhesive infusion layer and wax infusion layer)

GB 547946 (A), which does not specifically address the needs within the hockey game, such as, durability, low weight, improved puck control, thinness, required water resistance and repellency, etc.

U.S. Pat. No. 4,148,482 (A), which is focused on the method for fabricating and reinforcing coating for the impact surfaces of hockey sticks using textile tubing WO 95/11111, which does not specifically address the needs within the hockey game, such as, low weight, improved puck control, thinness, required water resistance and repellency, durability, etc.

The purpose of the work of inventors was to design a tape or sticker for covering of hockey stick blade, which would provide anti-slip effect, would be permanent, light and thin, and the result is represented by a backing carrier and anti-slip layer, which together form a multilayer anti-slip compact structure for individual/joint application on the forehand and/or backhand side of the hockey stick blade. The resulting product according to this invention should be thermally resistant, water resistant in order that only small volume of ice or snow would adhere to and the adhesive does not leave any residues on the hockey stick, even with good holding to it, but it could be easily removed and replaced. Such complex solution removes disadvantages of solutions as mentioned above in the paragraph on Background Art.

SUMMARY OF THE INVENTION

The above-mentioned disadvantages are to a substantial extent removed by composition of the backing carrier and anti-slip layer as such, which form together multilayer anti-slip compact structure for individual/joint application on the forehand and/or backhand side of the hockey stick blade using an adhesive layer according to the submitted invention. The essence of the invention in composition of the multilayer anti-slip compact structure for hockey stick blades is based on the fact that it contains the backing carrier and anti-slip layer applied on said backing carrier wherein the backing carrier of the anti-slip layer has two layers. The first layer is formed by a plastic film from polymer with thickness max. 0.3 mm and tensile strength min. 400 N and weight max. 130 g/m$^2$, preferably from 70 g/m$^2$ to 130 g/m$^2$ or fibre/net structure with thickness max. 0.3 mm and tensile strength min. 400 N and weight max. 130 g/m$^2$, preferably from 70 g/m$^2$ to 130 g/m$^2$, which contains at least one or a combination of following materials: cotton, viscose, glass fibres, plastic fibres, mainly polyester fibres and textile. On the first layer formed by plastic film or on the first layer formed by the net structure from fibres, the second resin or glue layer is applied, the so-called coating, with thickness max. 0.1 mm containing: polyurethane or polyacrylate or organic resin or polymer. The coating can be preferably applied on the both sides of the first layer, i.e. to the face and reverse side.

It is an advantage for games on ice or outdoors in any weather condition, if the fibre/net structure of the backing carrier of the anti-slip layer for hockey stick blades has a water resistant or water repellent impregnation (treatment) and/or thermal treatment in order to achieve dimensional stability for a broad interval of temperatures.

It is an advantage from the point of view of easy application of the backing carrier of the anti-slip layer on hockey stick blades, if the reverse side of the plastic film or reverse side of the fibre/net structure would have an adhesive layer with thermal resistance from −15° C. to +40° C., which would not leave any residues (adhesive residues) on hockey stick blade.

From the commercial point of view, it would be possible that the second resin/glue layer of the backing carrier of the anti-slip layer on hockey stick blades would be transparent with the purpose of visibility of advertisement placed under that layer, possibly also under the first layer.

This semi-product is an extraordinary suitable carrier for the anti-slip layer, possibly a semi-product for a product, if to this semi-product coarse grains are applied.

The related subject matter of this invention representing one inventor's idea represents further the anti-slip layer intended for application on the above described backing carrier. The anti-slip layer is formed by the third resin layer, with thickness max. 0.1 mm and weight max. 250 g/m$^2$, preferably max. 100 g/m$^2$ with content of epoxide and/or phenol or suitable polymer. The composition of this third resin layer has the purpose to improve necessary properties of material or anchoring of possible coarse grains. It is advantageous for certain applications, if the third resin layer of the anti-slip layer contains coarse grains, covering max. 50% of its surface. Furthermore, it is advantageous if the size of these coarsening grains is max. 200 micrometres and their weight is from 5 g/m$^2$ to 40 g/m$^2$. Furthermore, it is possible to coat the third resin layer of the anti-slip layer by a synthetic abrasion resistant layer.

Another option is to apply the above described anti-slip layer directly, this means by individual or joint application on the forehand and/or backhand side of the hockey stick blade. It is necessary to understand that joint application means bandaging by a tape around the entire hockey stick blade and individual application means attaching the patch on the forehand and/or backhand side of the hockey stick blade.

The above described backing carrier and anti-slip layer represent the basis for creation of the multilayer anti-slip compact structure for individual/joint application on the forehand and/or backhand side of the hockey stick blade according to the invention, which essence is based on the fact that it consists of the backing carrier and anti-slip layer applied thereon. The multilayer anti-slip compact structure has a shape of a tape or patch. It is obvious that this compact product also has on its reverse side an adhesive layer protected before use by a protective removable covering, coat and film and so on and the adhesive layer would not leave any residues (adhesive residues) on the hockey stick blade. Inventing of the suitable multilayer anti-slip compact structure was achieved exactly by the development of unique combination of materials, of their specific parameters and by finding suitable production process, while the final effect is also represented by improved accuracy and speed of shooting—even by more than 10%.

The advantages of the backing carrier, anti-slip layer, which together form the multilayer anti-slip compact structure for individual or joint application on the forehand and/or backhand side of the hockey stick blade using an adhesive layer according to the invention, are obvious from effects, demonstrated on the outside. In general, it could be stated, that the originality of the submitted solution is based on the fact, that it provides better handling of puck (ball or other objects), more precise passes and shooting. The product is light, thin and extremely resistant to mechanical damage, minimally soaking water and provides higher durability of the coarsened layer applied to hockey stick blade.

This product is an extremely good carrier for possible application of coarsening grains, as well as a suitable carrier for advertisement. This product could be used for all sports types, using a hockey stick. This solution was designed in order to change minimally hockey stick properties from the point of view of balance, flexibility and curvature. This product is easy to apply in order that every player, including smaller children or their parents, would manage product application from a roll of tape, this means by winding around (bandaging), or as a sticker, individually attached to the forehand and/or backhand side of the hockey stick blade.

Net structure from fibres, forming the first layer of the backing carrier of the multilayer anti-slip compact structure according to this invention could preferably have number of threads in warp and weft (per 1 cm) from 15 to 45. Furthermore, this net structure from fibres could have a value of TEX in warp and weft preferably from 15 to 50. Furthermore, this net structure from fibres can preferably have a maximum number of twists (per one meter) 500.

BRIEF DESCRIPTION OF THE DRAWINGS

The backing carrier, anti-slip layer and multilayer anti-slip compact structure for individual/joint application on the forehand and/or backhand side of the hockey stick blade according to the invention will be explained into details in the following drawings in which.

EXAMPLES

It is understood, that individual realizations according to the invention were introduced only as an illustration and not as limitations of technical solutions. Specialists, knowledgeable in the present state of technology, will find or be able to find out when using no more than routine experiments, many equivalents for specific realizations of this invention. These equivalents would be also covered by the scope of the following patent claims.

Based on the above presented examples and submitted solution, it would be not a problem for specialists to design alternative or equivalent solutions for composition of layers and selection of materials.

Example 1

Figure 1:
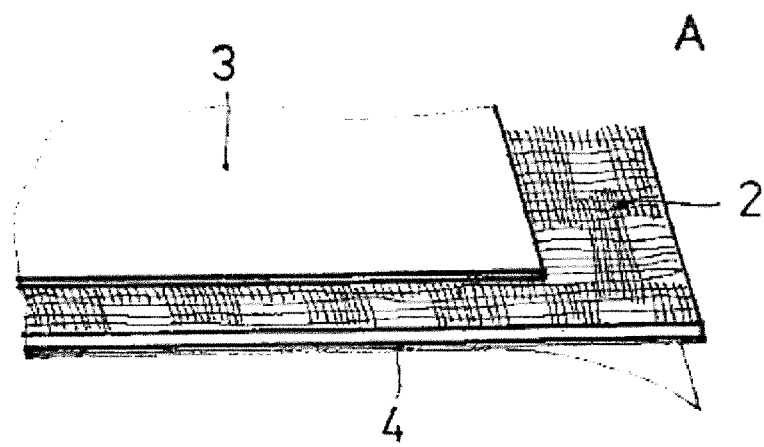
FIG. 1 presents the composition of the backing carrier with fibre/net structure.

This example of specific realization of the subject matter of this invention describes the first backing carrier A for application of the anti-slip layer B to hockey stick blades, as presented in FIG. 1. This backing carrier A of the anti-slip layer B has two layers. The first layer of the backing carrier A is formed by net structure 2 from fibres of high strength polyester with the following parameters:

| Material | High strength polyester |
|---|---|
| Tex | 30 |
| Twists | Without |
| Weave | Plain |
| Weight | 95.7 g/m2 |
| Threads per 1 cm - warp | 16.5 |
| Threads per 1 cm - weft | 16.7 |
| Material thickness (ČSN EN ISO 5084) | 0.16 mm |
| Maximum strength (N) - warp (ČSN EN ISO 13934-1) | 1464 |
| Maximum elongation (%) - warp (ČSN EN ISO 13934-1) | 20.6 |
| Maximum strength (N) - weft (ČSN EN ISO 13934-1) | 1499 |
| Maximum elongation (%) - weft (ČSN EN ISO 13934-1) | 21 |

The raw net structure 2 from fibres of the backing carrier A of the anti-slip layer B has a hydrophobic impregnation and thermal treatment using high temperatures with the purpose of dimensional stabilization (fixation) of the material. To the first layer treated this way formed by net structure 2 from fibres, a coating is applied (second resin or adhesive layer 3) with weight 42.3 g/m² and content of: polyurethane and acrylate. After hydrophobic impregnation, dimensional stabilization (fixation) and coating application, that material has the following parameters:

| Weight | 138 g/m² |
|---|---|
| Material thickness (ČSN EN ISO 5084) | 0.18 mm |
| Maximum strength (N) - warp (ČSN EN ISO 13934-1) | 1272 |
| Maximum elongation (%) - warp (ČSN EN ISO 13934-1) | 15 |
| Maximum strength (N) - weft (ČSN EN ISO 13934-1) | 1275 |
| Maximum elongation (%) - weft (ČSN EN ISO 13934-1) | 15.1 |

The reverse side of the net structure 2 from fibres (also with applied coating 3—not presented in the figures) has an adhesive layer 4 with thermal resistance from −15° C. to +40° C., which does not leave any residues (adhesive residues) on the hockey stick blade.

In the next alternative, this semi-product could be considered as product, if to this semi-product, using for instance epoxy and/or phenolic resin, coarsening grains 6 for instance of corundum (aluminium oxide), silica, silicon carbide, ceramic abrasive, hard plastic, glass and so on would be applied. Use of this innovative backing layer provides better control of puck (ball or of other objects), more precise passes and shooting, because it makes this product lighter, thinner, more resistant against mechanical damage, soaking minimum of water and providing higher durability of the coarsened layer applied on the hockey stick blade.

Example 1a

This example of specific realization of the subject matter of this invention describes the first backing carrier A for application of the anti-slip layer B on hockey stick blades, as presented in FIG. 1. This backing carrier A of the anti-slip layer B has two layers. The first layer of the backing carrier A has net structure 2 from glass fibres with the following parameters:

| Material | Glass fibre |
|---|---|
| Tex | 34 |
| Twists per meter | Z20 |
| Weave | Plain |
| Weight | 108 g/m² |
| Threads per 1 cm - warp | 16 |
| Threads per 1 cm - weft | 16 |
| Material thickness (ČSN EN ISO 5084) | 0.08 mm |
| Maximum strength (N) | 1200 |
| L.O.I. (625 C. - 60 min.) | 1.03 |

The raw net structure 2 from fibres of the backing carrier A of the anti-slip layer B has a hydrophobic impregnation and thermal treatment using high temperatures with the purpose of dimensional stabilization (fixation) of material. To such treated first layer formed by net structure 2 from fibres, a coating is applied on the basis of polyacrylate (the second resin or glue layer 3) with weight 30 g/m². After hydrophobic impregnation, dimensional stabilization (fixation) and coating application, this material has the following parameters:

| Weight | 138 g/m² |
|---|---|
| Material thickness (ČSN EN ISO 5084) | 0.1 mm |
| Maximum strength (N) - ČSN EN ISO 13934-1 | 1150 |

The reverse side of the net structure 2 from fibres (also with applied coating 3 has an adhesive layer 4 with thermal resistance from −15° C. to +40° C., which does not leave any residues (adhesive residues) on the hockey stick blade.

In the next alternative, this semi-product could be considered as product, if to this semi-product coarsening grains 6, for instance of corundum (aluminium oxide), glass, hard plastic and so on would be applied, using for instance epoxy and/or phenolic resin. Use of this innovative backing carrier provides better control of puck (ball or of other objects), more precise passes and shooting, because it makes this product lighter, thinner, more resistant against mechanical damage, minimum soaking water and providing higher durability of the coarsened layer applied on the hockey stick blade.

An alternative for the above-mentioned materials from polyester or glass fibre for the net structure 2 from fibres represents also cotton or viscose.

Example 1b

This example of specific realization of the subject matter of this invention describes the first backing carrier A for application of the anti-slip layer B to hockey stick blades, as presented in FIG. 1. This backing carrier A of the anti-slip layer B has two layers. The first layer of the backing carrier A is formed by the net structure 2 from fibres of polyester with the following parameters:

| Material | Polyester |
|---|---|
| Tex - weft | 16.5 |
| Tex - warp | 16.5 |
| Twists per meter | Z300 |
| Weave | Plain |
| Weight | 105 g/m² |
| Threads per 1 cm - warp | 33 |
| Threads per 1 cm - weft | 23 |
| Material thickness (ČSN EN ISO 5084) | 0.16 mm |
| Tensile strength - weft | 800 |
| Tensile strength - warp | 500 |

The raw net structure 2 from fibres of the backing carrier A of the anti-slip layer B has hydrophobic impregnation and thermal treatment by high temperatures with the purpose of dimensional stabilization (fixation) of material. To such treated first layer formed by the net structure 2 from fibres, a coating is applied using also the method of immersion (the second resin or glue layer 3) with weight 42 g/m² and content of polyurethane and polyacrylate. After hydrophobic impregnation, dimensional stabilization (fixation) and coating application (on both sides), this material has the following parameters:

| Weight | 147 g/m² |
|---|---|
| Material thickness (ČSN EN ISO 5084) | 0.18 mm |
| Soaking (g/m²) | 2.21 |

The reverse side of the net structure 2 from fibres (also with applied coating 3) has an adhesive layer 4 with thermal resistance from −15° C. to +40° C., which does not leave any residues (adhesive residues) on the hockey stick blade.

In the next alternative, this semi-product could be considered as product, if to this semi-product using for instance epoxy resin and hardener coarsening grains 6 would be applied, for instance of corundum (aluminium oxide) or silicon carbide which have according to FEPA standard the size P120 (this means approximately 125 micrometres), cover at maximum 50% of its surface and weight of 20 g/m². Use of this innovative backing carrier provides better control of puck (ball or of other objects), more precise passes and shooting, because it makes this product lighter, thinner, more resistant against mechanical damage, minimum soaking water and providing higher durability of the coarsened layer applied on the hockey stick blade.

Example 1c

This example of specific realization of the subject matter of this invention describes the first backing carrier A for application of the anti-slip layer B to hockey stick blades, as presented in FIG. 1. This backing carrier A of the anti-slip layer B has two layers. The first layer of the backing carrier A is formed by the net structure 2 from glass fibres with the following parameters:

| Material | Glass fibre |
|---|---|
| Tex | 34 |
| Twists per meter | Z40 |
| Weave | Plain |
| Weight | 108 g/m² |
| Threads per 1 cm - warp | 24 |
| Threads per 1 cm - weft | 23 |
| Material thickness (ČSN EN ISO 5084) | 0.09 mm |
| Maximum strength (N) | 1000 |
| L.O.I. (%) | 0.3 |

The raw net structure 2 from fibres of the backing carrier A of the anti-slip layer B has a hydrophobic impregnation. To such treated first layer, formed by the net structure 2 from fibres, a coating is applied using also the method of immersion based on polyacrylate (the second resin or glue layer 3) with weight 34 g/m². After hydrophobic impregnation and coating application (on face and reverse sides), this material has the following parameters:

| Weight | 142 g/m² |
|---|---|
| Material thickness (ČSN EN ISO 5084) | 0.14 mm |
| Soaking (g/m²) | 0.44 |

The reverse side of the net structure 2 from fibres (also with applied coating 3) has an adhesive layer 4 with thermal resistance from −15° C. to +40° C., which does not leave any residues (adhesive residues) on the hockey stick blade.

In the next alternative, this semi-product could be considered as product, if to this semi-product using for instance epoxy or phenolic resins coarsening grains 6 would be applied, for instance of corundum, glass, hardened plastic and so on. Use of this innovative backing layer provides better control of puck (ball or of other objects), more precise passes and shooting, because it makes this product lighter, thinner, more resistant against mechanical damage, minimum soaking water and providing higher durability of the coarsened layer applied on the hockey stick blade.

Example 1d

This example of specific realization of the subject matter of this invention describes the first backing carrier A for application of the anti-slip layer B to hockey stick blades, as presented in FIG. 1. This backing carrier A of the anti-slip layer B has two layers. The first layer of the backing carrier A is formed by the net structure 2 from polyester fibres with the following parameters:

| Material | Polyester |
|---|---|
| Tex - weft | 44 |
| Tex - warp | 44 |
| Twists per meter | Z450 |
| Weave | Plain |
| Weight | 125 g/m² |
| Threads per 1 cm - warp | 42 |
| Threads per 1 cm - weft | 42 |
| Material thickness (ČSN EN ISO 5084) | 0.25 mm |
| Tensile strength - warp | 800 |
| Tensile strength - weft | 800 |

The raw net structure 2 from fibres of the backing carrier A of the anti-slip layer B has a hydrophobic impregnation and thermal treatment by high temperatures with the purpose of dimensional stabilization (fixation) of material. To such treated first layer formed by the net structure 2 from fibres, a coating is applied using also the method of immersion (the second resin or glue layer 3) with weight 42 g/m2 and content of polyurethane, polyacrylate, melamine formaldehyde and other additives. After hydrophobic impregnation, dimensional stabilization (fixation) and coating application (on both sides) are carried out, that material has the following parameters:

| Weight | 167 g/m$^2$ |
|---|---|
| Material thickness (ČSN EN ISO 5084) | 0.27 mm |
| Soaking (g/m$^2$) | 1.98 |

The reverse side of the net structure 2 from fibres (also with applied coating 3) has an adhesive layer 4 with thermal resistance from −15° C. to +40° C., which does not leave any residues (adhesive residues) on the hockey stick blade.

In the next alternative, this semi-product could be considered as product, if to this semi-product using for instance a mixture of epoxy resin, hardener and water coarsening grains 6 would be applied, for instance of silicon carbide which have according to FEPA standard the size P120, cover at maximum 50% of its surface and have a weight of 10 g/m$^2$. Use of this innovative backing carrier provides better control of puck (ball or of other objects), more precise passes and shooting, because it makes this product lighter, thinner, more resistant against mechanical damage, minimum soaking water and providing higher durability of the coarsened layer applied on the hockey stick blade.

Example 2

Figure 2:
FIG. 2 presents structure of the simplest anti-slip layer.

This example of specific realization of the subject matter of this invention describes the first anti-slip layer B for application on the above described backing carrier A from examples 1 and 1a. The first anti-slip layer B is presented in FIG. 2. It is formed by the third resin layer 5, thickness max. 0.1 mm and weight max. 250 g/m$^2$ with content of epoxide and/or phenol, for instance epoxy resin based on bisphenol A. It was applied only to the face side of the backing carrier A from examples 1 and 1a.

Example 3

Figure 3:
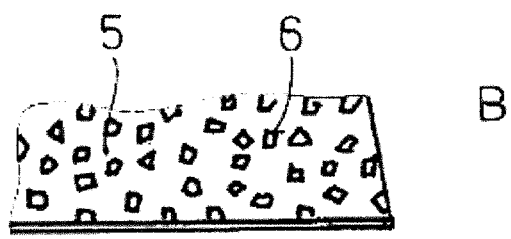
FIG. 3 presents structure of the anti-slip layer including coarsening grains.

This example of specific realization of the subject matter of this invention describes the second anti-slip layer B for application on the above described backing carrier A from examples 1 and 1a. The second anti-slip layer B is presented in FIG. 3. It is formed by the third resin layer 5 with thickness max. 0.1 mm and weight max. 250 g/m$^2$ with content of epoxide and phenol, for instance epoxy resin based on bisphenol A (applied only to the face side of the backing carrier A from examples 1 and 1a). Furthermore, it contains coarsening grains 6, covering max. 50% of its surface.

Example 4

Figure 4:
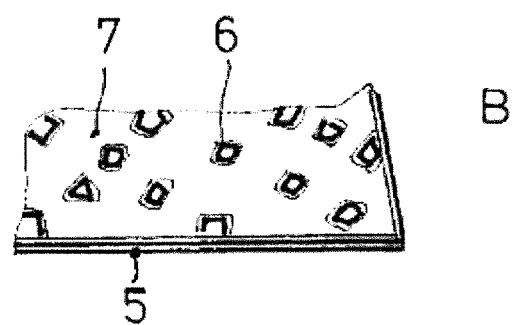
FIG. 4 presents structure of the anti-slip layer including coarsening grains and abrasion resistant layer.

This example of specific realization of the subject matter of this invention describes the third anti-slip layer B for application on the above described backing carrier A from examples 1 and 1a. The third anti-slip layer B is presented in FIG. 4. It is formed by the third resin layer 5, thickness max. 0.1 mm and weight max. 250 g/m$^2$ with content of epoxide or phenol, this means epoxy resin based on the bisphenol A (applied only to the face side of the backing carrier A from examples 1 and 1a). Furthermore, it contains coarsening grains 6, covering max. 50% of its surface and is finally coated by a synthetic abrasion resistant layer 7.

It was agreed for examples 2-4 and 6, that the above described anti-slip layers could be also applied without any backing carrier A, directly on the forehand and/or backhand side of the hockey stick blade, individually, by attaching of two patches of the anti-slip layer or together by bandaging a tape around the entire hockey stick blade.

Example 5

This example of specific realization of the subject matter of this invention describes the multilayer anti-slip compact structure for individual or joint application on forehand and/or backhand side of the hockey stick blades. The multilayer anti-slip compact structure consists of backing carrier A and anti-slip layer B applied thereon. The backing carrier A with anti-slip layer B applied thereon as product has a shape of tape or patch.

Figure 5:
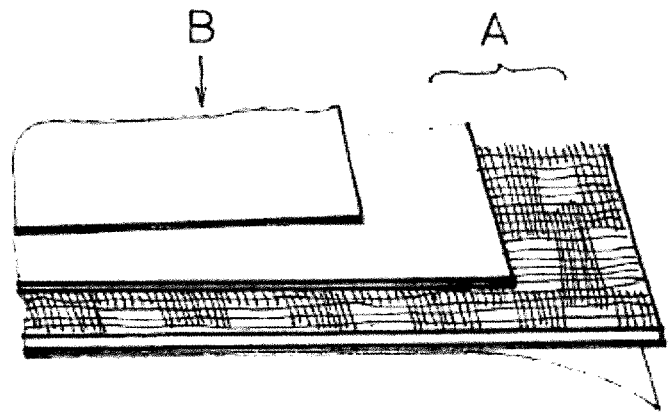
FIG. 5 presents structure of the multilayer anti-slip compact structure for hockey stick blades with backing carrier with fibre/net structure and the simplest anti-slip layer.

By combining examples 1 and 2 a multilayer anti-slip compact structure for hockey stick blade with a backing carrier with fibre net structure and with the simplest anti-slip layer consisting only of resin is formed, as presented in FIG. 5.

Figure 6:
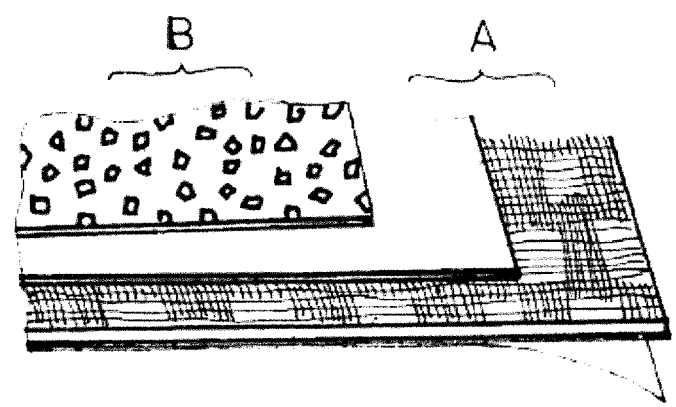
FIG. 6 presents structure of the multilayer anti-slip compact structure for hockey stick blades with backing carrier with net structure from fibres and anti-slip layer including coarsening grains.

By combining examples 1 and 3 a multilayer anti-slip compact structure for hockey stick blade with backing carrier with fibre net structure and resin anti-slip layer containing coarsening grains 6, is formed, as presented in FIG. 6.

Figure 7:
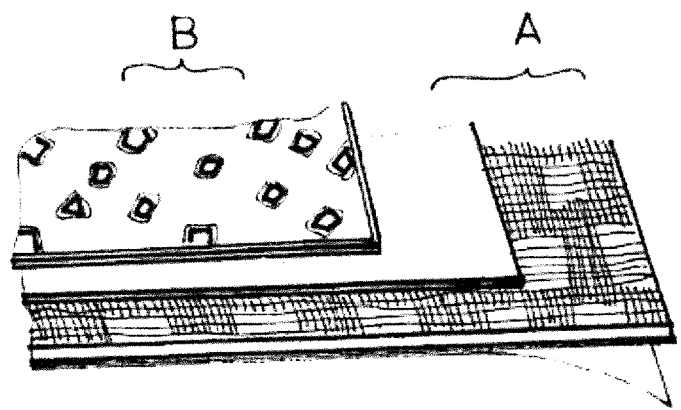
FIG. 7 presents structure of the multilayer anti-slip compact structure for hockey stick blades with backing carrier with fibre/net structure and anti-slip layer including coarsening grains and abrasion resistant layer.

By combining examples 1 and 4 a multilayer anti-slip compact structure for hockey stick blade with backing carrier with fibre net structure and resin anti-slip layer, containing coarsening grains 6, covered by a synthetic abrasion resistant layer 7, is formed, as presented in FIG. 7.

Example 6

Figure 8:
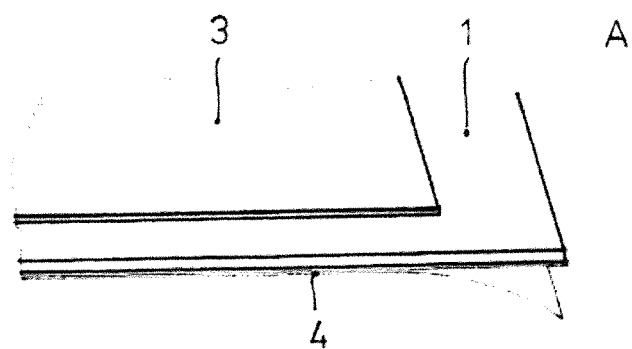
FIG. 8 presents structure of the backing carrier with a plastic film.
Figure 9:
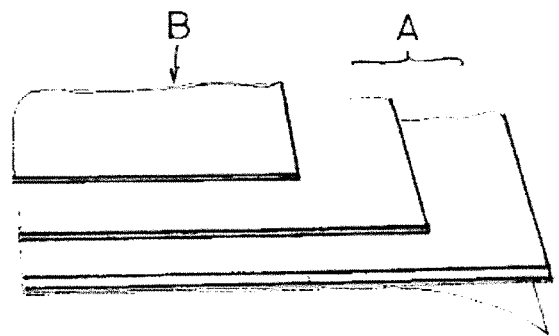
FIG. 9 presents structure of the multilayer anti-slip compact structure for hockey stick blades with backing carrier with plastic film and the simplest anti-slip layer.
Figure 10:
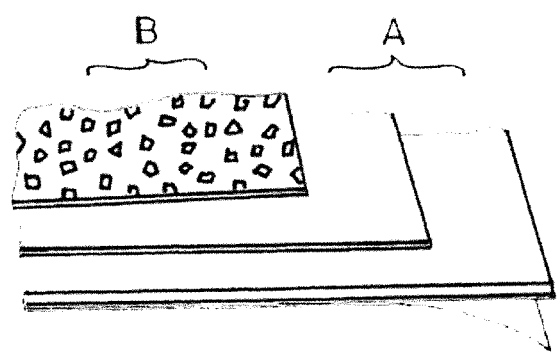
FIG. 10 presents structure of the multilayer anti-slip compact structure for hockey stick blades with backing carrier with plastic film and anti-slip layer including coarsening grains.
Figure 11:
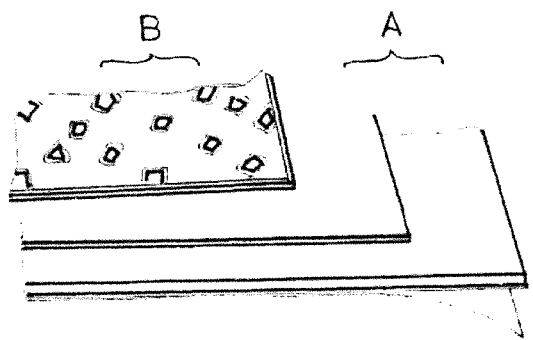
FIG. 11 presents structure of the multilayer anti-slip compact structure for hockey stick blades with backing carrier with plastic film and anti-slip layer including coarsening grains and abrasion resistant layer.

This example of the specific realization of the subject matter of this invention describes the second backing carrier A for application of the anti-slip layer B on hockey stick blade, as presented in FIG. 8. This backing carrier A of the anti-slip layer, has two layers. The first layer is formed by a polymer plastic film 1, for instance from polyester, thickness max. 0.3 mm and tensile strength min. 400 N and weight max. 130 g/m$^2$. To this first layer formed by the plastic film 1, the second resin layer 3, with thickness max. 0.1 mm with a content of: polyacrylate is applied. The reverse side of the plastic film 1 has an adhesive layer 4 with thermal resistance from −15° C. to +40° C., which does not leave any residues (adhesive residues) on the hockey stick blade.

Another alternative solution provides transparent first layer of the backing carrier A and the second resin or glue layer 3 of the backing carrier A of the anti-slip layer B for hockey stick blades with the purpose of visibility of advertisement placed under these layers.

In the next alternative, it could be possible to consider this semi-product as product, if to this semi-product coarsening grains 6, for instance of corundum, hard plastic and glass and so on would be applied individually or in a combination.

Example 7

This example of the specific realization of the subject matter of this invention describes the first anti-slip layer B for application to the above described backing carrier A from examples 1 and 2 and 6. The first anti-slip layer B is presented in FIG. 2. This layer has a third resin layer 5 with thickness max. 0.1 mm and weight max. 250 g/m² with content of epoxide and phenol, this means epoxy resin based on bisphenol A and/or suitable polymer. The reverse side of the third resin layer 5 has or as an alternative does not have any adhesive layer 4.

Example 7a

This example of the specific realization of the subject matter of this invention describes the first anti-slip layer B for application on the above described backing carrier A from examples 1 and 2 and 6. The first anti-slip layer B is presented in FIG. 2. It is formed by the third resin layer 5 with thickness max. 0.1 mm and weight max. 90 g/m² with a content of epoxide and phenol, this means epoxy resin based on bisphenol A and/or suitable polymer. The reverse side of the third resin layer 5 has or as an alternative does not have any adhesive layer 4.

Example 8

This example of the specific realization of the subject matter of this invention describes the second anti-slip layer B for application to the above described backing carrier A from examples 1 and 2 and 6. The second anti-slip layer B is presented in FIG. 3. This layer has a third resin layer 5 with thickness max. 0.1 mm and weight max. 250 g/m² with content of epoxide and phenol, this means epoxy resin based on bisphenol A and/or suitable polymer. Furthermore, it contains coarsening grains 6, covering max. 50% of its surface. The reverse side of the third resin layer 5 has or as an alternative does not have any adhesive layer 4.

Example 9

This example of the specific realization of the subject matter of this invention describes the third anti slip-layer B for application to the above described backing carrier A from examples 1 and 2 and 6. The third anti slip layer B is presented in FIG. 4. This layer has a third resin layer 5 with thickness max. 0.1 mm and weight max. 250 g/m² with content of epoxide and/or phenol. Furthermore, it contains coarsening grains 6, covering max. 50% of its surface and finally is covered by a synthetic abrasion resistant layer 7. The reverse side of the third resin layer 5 has or as an alternative does not have any adhesive layer 4.

Example 9a

This example of the specific realization of the subject matter of this invention describes the third anti slip-layer B for application to the above described backing carrier A from examples 1 and 2 and 6. The third anti-slip layer B is presented in FIG. 4. This layer has a third resin layer 5 with thickness max. 0.1 mm and weight max. 80 g/m² with content of epoxide and hardener. Furthermore, it contains coarsening grains 6, covering max. 50% of its surface, has weight 10 g/m² and the size according to the FEPA standard P220 (this means approximately 68 micrometres) and finally covered by a transparent synthetic abrasion resistant layer 7, which contains epoxy resin and hardener.

Example 9b

This example of the specific realization of the subject matter of this invention describes the third anti slip-layer B for application to the above described backing carrier A from examples 1 and 2 and 6. The third anti-slip layer B is presented in FIG. 4. It is formed by the third resin layer 5 with thickness max. 0.1 mm and weight max. 80 g/m² with content of epoxide and/or phenol. Furthermore, it contains coarsening grains 6, covering max. 50% of its surface, have weight 32 g/m² and size according to the FEPA standard P120 (this means approximately 125 micrometres) and finally covered by a synthetic abrasion resistant layer 7, which contains epoxy resin and hardener.

Comparison of weight and thickness of the specific final product (adhesive layer protected by a liner+backing carrier, third anti-slip layer, coarsening grains) to alternative products in the market:

| Product | Prevailing material | Weight in g (one pair) | Thickness in mm |
| --- | --- | --- | --- |
| Final product (invention) | Polyester, resin, corundum | 9.6 | 0.47 |
| BladeTape | Rubber | 18.36 | 1.09 |
| BladeShark | Rubber | 24.8 | 0.8 |
| Tacki-mac | Rubber | 29.68 | 0.54 |
| Torpedo (Sonic) | Rubber | 23.3 | 1.35 |
| Traditional tape | Textile | 15-20 | 0.4-0.5 |

As it is obvious from the table above, product which used this invention has excellent thickness as well as weight, plus it has much better properties from the point of view of its durability, puck control, soaking and catching ice and snow.

INDUSTRIAL APPLICABILITY

Industrial usability of the backing carrier, anti-slip layer and multilayer anti-slip compact structure for individual/joint application on forehand and/or backhand side of the hockey stick blade according to the invention, can be used for all sports, using hockey or other similar stick. It could be produced in serial production and used for instance during production of tapes or stickers for hockey stick blades, applied with the purpose to make blade more coarsened.

The invention claimed is:

1. A multilayer anti-slip compact structure for individual/joint application on a forehand and/or a backhand side of a hockey stick blade wherein the multilayer anti-slip compact structure contains a backing carrier (A) and an anti-slip layer (B) applied on said backing carrier (A), wherein the backing carrier (A) contains a first layer and a second resin or glue layer (3) applied on the first layer, wherein the first layer is formed by either a plastic film from a polymer or a fibre/net structure with thickness max. 0.3 mm and tensile strength min. 400 N and weight max. 130 g/m²; and the second resin or glue layer (3) contains polyurethane, polyacrylate, organic resin or suitable polymer, or their combination and has thickness max. 0.1 mm; and the anti-slip layer (B) is formed by a third resin layer (5) containing epoxide and/or phenol or polymer with thickness max. 0.1 mm and weight max. 250 g/m².

2. The multilayer anti-slip compact structure according to claim 1, wherein the second resin or glue layer (3) is applied on the first layer on both sides.

3. The multilayer anti-slip compact structure according to claim 2, wherein the thickness of the first layer is max. 0.3 mm, weight of the first layer is from 70 g/m² to 130 g/m², and weight of the third resin layer (5) is max. 100 g/m².

4. The multilayer anti-slip compact structure according to claim 1, wherein the first layer of the backing carrier (A) is formed by a plastic film (1) from polymer or by a net structure (2) from fibres containing cotton, viscose, glass fibres, plastic fibres or polyester fibres, or their combination.

5. The multilayer anti-slip compact structure according to claim 4, wherein the net structure (2) contains polyester fibres.

6. The multilayer anti-slip compact structure according to claim 5, wherein the thickness of the first layer is max. 0.3 mm, weight of the first layer is from 70 g/m$^2$ to 130 g/m$^2$, and weight of the third resin layer (5) is max. 100 g/m$^2$.

7. The multilayer anti-slip compact structure according to claim 4, wherein the net structure (2) from fibres has waterproof or water repellent impregnation and/or thermal treatment in order to achieve dimensional stabilization.

8. The multilayer anti-slip compact structure according to claim 7, wherein the thickness of the first layer is max. 0.3 mm, weight of the first layer is from 70 g/m$^2$ to 130 g/m$^2$, and weight of the third resin layer (5) is max. 100 g/m$^2$.

9. The multilayer anti-slip compact structure according to claim 4, wherein the plastic film (1) from polymer is a polyester film.

10. The multilayer anti-slip compact structure according to claim 9, wherein the thickness of the first layer is max. 0.3 mm, weight of the first layer is from 70 g/m$^2$ to 130 g/m$^2$, and weight of the third resin layer (5) is max. 100 g/m$^2$.

11. The multilayer anti-slip compact structure according to claim 4, wherein the net structure (2) from fibres has number of threads per one cm in warp and weft from 15 to .

12. The multilayer anti-slip compact structure according to claim 11, wherein the thickness of the first layer is max. 0.3 mm, weight of the first layer is from 70 g/m$^2$ to 130 g/m$^2$, and weight of the third resin layer (5) is max. 100 g/m$^2$.

13. The multilayer anti-slip compact structure according to claim 4, wherein the net structure (2) from fibres has TEX in warp and weft from 15 to 50.

14. The multilayer anti-slip compact structure according to claim 13, wherein the thickness of the first layer is max. 0.3 mm, weight of the first layer is from 70 g/m$^2$ to 130 g/m$^2$, and weight of the third resin layer (5) is max. 100 g/m$^2$.

15. The multilayer anti-slip compact structure according to claim 4, wherein the net structure (2) from fibres is a plain weave and has number of threads per one cm in warp and weft from 15 to 45 and TEX in warp and weft from 15 to 50.

16. The multilayer anti-slip compact structure according to claim 15, wherein the net structure (2) from fibres has number of twists per one meter max. 500.

17. The multilayer anti-slip compact structure according to claim 16, wherein the thickness of the first layer is max. 0.3 mm, weight of the first layer is from 70 g/m$^2$ to 130 g/m$^2$, and weight of the third resin layer (5) is max. 100 g/m$^2$.

18. The multilayer anti-slip compact structure according to claim 15, wherein the net structure (2) from fibres has number of twists per one meter max. 500 and wherein the backing carrier (A) and anti-slip layer (B) of resin applied thereon has a shape of a tape or a patch.

19. The multilayer anti-slip compact structure according to claim 15, wherein the thickness of the first layer is max. 0.3 mm, weight of the first layer is from 70 g/m$^2$ to 130 g/m$^2$, and weight of the third resin layer (5) is max. 100 g/m$^2$.

20. The multilayer anti-slip compact structure according to claim 4, wherein the reverse side of the plastic film (1) from polymer or the reverse side of the net structure (2) from fibres has an adhesive layer (4) with thermal resistance from −15° C. to +40° C.

21. The multilayer anti-slip compact structure according to claim 20, wherein the thickness of the first layer is max. 0.3 mm, weight of the first layer is from 70 g/m$^2$ to 130 g/m$^2$, and weight of the third resin layer (5) is max. 100 g/m$^2$.

22. The multilayer anti-slip compact structure according to claim 4, wherein the net structure (2) contains polyester and wherein the backing carrier (A) and anti-slip layer (B) of resin applied thereon has a shape of a tape or a patch.

23. The multilayer anti-slip compact structure according to claim 4, wherein the net structure (2) from fibres has waterproof or water repellent impregnation and/or thermal treatment in order to achieve dimensional stabilization and wherein the backing carrier (A) and anti-slip layer (B) of resin applied thereon has a shape of a tape or a patch.

24. The multilayer anti-slip compact structure according to claim 4, wherein the plastic film (1) from polymer is a polyester film and wherein the backing carrier (A) and anti-slip layer (B) of resin applied thereon has a shape of a tape or a patch.

25. The multilayer anti-slip compact structure according to claim 4, wherein the net structure (2) from fibres has number of threads per one cm in warp and weft from 15 to 45 and wherein the backing carrier (A) and anti-slip layer (B) of resin applied thereon has a shape of a tape or a patch.

26. The multilayer anti-slip compact structure according to claim 4, wherein the net structure (2) from fibres has TEX in warp and weft from 15 to 50 and wherein the backing carrier (A) and anti-slip layer (B) of resin applied thereon has a shape of a tape or a patch.

27. The multilayer anti-slip compact structure according to claim 4, wherein the net structure (2) from fibres is a plain weave and has number of threads per one cm in warp and weft from 15 to 50 and TEX in warp and weft from 15 to 50 and wherein the backing carrier (A) and anti-slip layer (B) of resin applied thereon has a shape of a tape or a patch.

28. The multilayer anti-slip compact structure according to claim 4, wherein the reverse side of the plastic film (1) from polymer or the reverse side of the net structure (2) from fibres has an adhesive layer (4) with thermal resistance from −15° C. to +40° C. and wherein the backing carrier (A) and anti-slip layer (B) of resin applied thereon has a shape of a tape or a patch.

29. The multilayer anti-slip compact structure according to claim 4, wherein the thickness of the first layer is max. 0.3 mm, weight of the first layer is from 70 g/m$^2$ to 130 g/m$^2$, and weight of the third resin layer (5) is max. 100 g/m$^2$.

30. The multilayer anti-slip compact structure according to claim 1, wherein the second resin or glue layer (3) is transparent.

31. The multilayer anti-slip compact structure according to claim 30, wherein the thickness of the first layer is max. 0.3 mm, weight of the first layer is from 70 g/m$^2$ to 130 g/m$^2$, and weight of the third resin layer (5) is max. 100 g/m$^2$.

32. The multilayer anti-slip compact structure according to claim 1, wherein the third resin layer (5) contains coarsening grains (6) which cover max. 50% of its surface.

33. The multilayer anti-slip compact structure according to claim 32, wherein the coarsening grains (6) have a maximum size of 200 micrometres and weight from 5 g/m$^2$ to 40 g/m$^2$.

34. The multilayer anti-slip compact structure according to claim 33, wherein the thickness of the first layer is max. 0.3 mm, weight of the first layer is from 70 g/m$^2$ to 130 g/m$^2$, and weight of the third resin layer (5) is max. 100 g/m$^2$.

35. The multilayer anti-slip compact structure according to claim 32, wherein the coarsening grains (6) have a maximum size of 200 micrometres and weight from 5 g/m$^2$ to 40 g/m² and wherein the backing carrier (A) and anti-slip layer (B) of resin applied thereon has a shape of a tape or a patch.

36. The multilayer anti-slip compact structure according to claim 32, wherein the thickness of the first layer is max. 0.3 mm, weight of the first layer is from 70 g/m² to 130 g/m², and weight of the third resin layer (5) is max. 100 g/m².

37. The multilayer anti-slip compact structure according to claim 1, wherein the third resin layer (5) is coated by a synthetic abrasion resistant layer (7).

38. The multilayer anti-slip compact structure according to claim 37, wherein the thickness of the first layer is max. 0.3 mm, weight of the first layer is from 70 g/m² to 130 g/m², and weight of the third resin layer (5) is max. 100 g/m².

39. The multilayer anti-slip compact structure according to claim 1, wherein the backing carrier (A) and anti-slip layer (B) of resin applied thereon has a shape of a tape or a patch.

40. The multilayer anti-slip compact structure according to claim 1, wherein the second resin or glue layer (3) is applied on the first layer on both sides and wherein the backing carrier (A) and anti-slip layer (B) of resin applied thereon has a shape of a tape or a patch.

41. The multilayer anti-slip compact structure according to claim 1, wherein the first layer of the backing carrier (A) is formed by a plastic film (1) from polymer or by a net structure (2) from fibres containing cotton, viscose, glass fibres, plastic fibres, polyester, or their combination and wherein the backing carrier (A) and anti-slip layer (B) of resin applied thereon has a shape of a tape or a patch.

42. The multilayer anti-slip compact structure according to claim 1, wherein the second resin or glue layer (3) is transparent and wherein the backing carrier (A) and anti-slip layer (B) of resin applied thereon has a shape of a tape or a patch.

43. The multilayer anti-slip compact structure according to claim 1, wherein the third resin layer (5) contains coarsening grains (6) which cover max. 50% of its surface and wherein the backing carrier (A) and anti-slip layer (B) of resin applied thereon has a shape of a tape or a patch.

44. The multilayer anti-slip compact structure according to claim 1, wherein the third resin layer (5) is coated by a synthetic abrasion resistant layer (7) and wherein the backing carrier (A) and anti-slip layer (B) of resin applied thereon has a shape of a tape or a patch.

45. The multilayer anti-slip compact structure according to claim 1, wherein the thickness of the first layer is max. 0.3 mm, weight of the first layer is from 70 g/m² to 130 g/m², and weight of the third resin layer (5) is max. 100 g/m².

46. The multilayer anti-slip compact structure according to claim 45, wherein the backing carrier (A) and anti-slip layer (B) of resin applied thereon has a shape of a tape or a patch.

* * * * *